United States Patent
Ramasamy et al.

(10) Patent No.: US 11,510,154 B1
(45) Date of Patent: Nov. 22, 2022

(54) ADJUSTING TRANSMIT POWER BASED ON PHYSICAL CONFIGURATION USAGE MODE USING SERIAL INTERFACE PROTOCOL TO RADIO

(71) Applicant: Dell Products L.P., Round Rock, TX (US)

(72) Inventors: Suresh Ramasamy, Cedar Park, TX (US); Lars Fredrik Proejts, Taipei (TW); Manoj Jain, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/374,862

(22) Filed: Jul. 13, 2021

(51) Int. Cl.
*H04W 52/28* (2009.01)
*H04W 52/54* (2009.01)
*H04W 72/04* (2009.01)
*H04W 52/02* (2009.01)

(52) U.S. Cl.
CPC ..... *H04W 52/283* (2013.01); *H04W 52/0229* (2013.01); *H04W 52/54* (2013.01); *H04W 72/048* (2013.01)

(58) Field of Classification Search
CPC . H04W 52/283; H04W 52/54; H04W 72/048; H04W 52/0229
See application file for complete search history.

(56) References Cited

U.S. PATENT DOCUMENTS

2021/0204251 A1   7/2021  Laghate et al.

FOREIGN PATENT DOCUMENTS

WO    WO-2021126250 A1 *  6/2021

* cited by examiner

*Primary Examiner* — Keith Ferguson
(74) *Attorney, Agent, or Firm* — Larson Newman, LLP

(57) ABSTRACT

An information handling system includes a radio connected to an antenna subsystem, and a proximity sensor configured to detect a proximity of a user to the antenna subsystem. An antenna controller may identify an antenna physical configuration of an antenna subsystem, retrieve a power table corresponding to the antenna physical configuration, transmit the power table to the radio via a direct communication interface between the antenna controller and the radio, and communicate a message to the radio, the message in response to the proximity of the user to the antenna subsystem. The radio may set a radio transmit power level in response to the message.

20 Claims, 5 Drawing Sheets

ADJUSTING TRANSMIT POWER BASED ON PHYSICAL CONFIGURATION USAGE MODE USING SERIAL INTERFACE PROTOCOL TO RADIO

FIELD OF THE DISCLOSURE

The present disclosure generally relates to information handling systems, and more particularly relates to adjusting transmit power based on physical configuration usage mode using serial interface protocol to radio.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a radio connected to an antenna subsystem, and a proximity sensor configured to detect a proximity of a user to the antenna subsystem. An antenna controller may identify an antenna physical configuration of an antenna subsystem, retrieve a power table corresponding to the antenna physical configuration, transmit the power table to the radio via a universal asynchronous receiver/transmitter interface, and communicate a message to the radio, the message in response to the proximity of the user to the antenna subsystem. The radio may set a radio transmit power level in response to the message.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
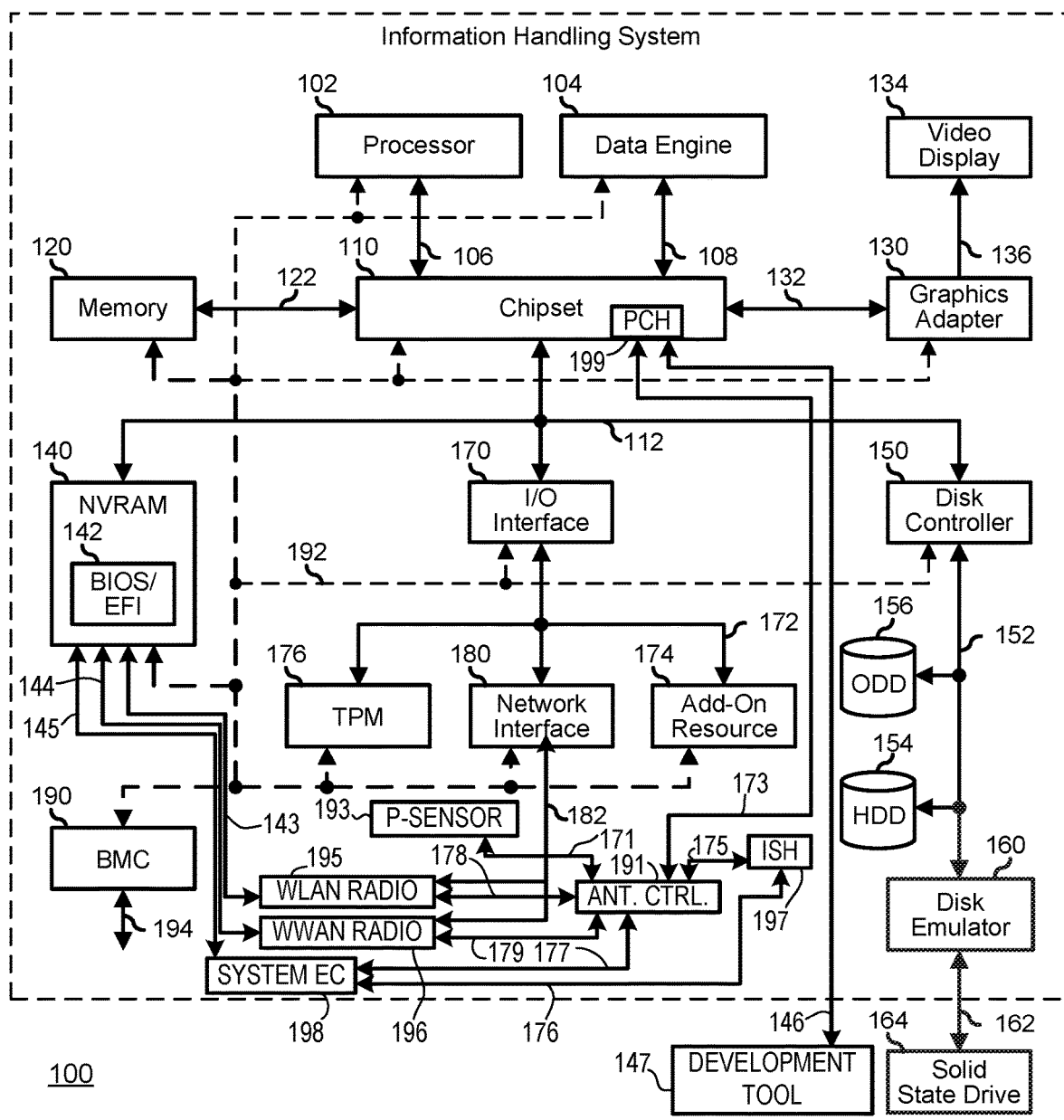
FIG. 1 is a block diagram illustrating an information handling system (IHS) according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics adapter 130, include a basic input and output system/extensible firmware interface (BIOS/EFI) module 140, a disk controller 150, a disk emulator 160, an input/output (I/O) interface 170, a network interface 180, baseboard management controller (BMC) 190, antenna controller (AC) 191, proximity sensor (P-sensor) 193, wireless local area network (WLAN) radio 195, wireless wide area network (WWAN) radio 196, integrated sensor hub (ISH) 197, and system embedded controller (EC) 198. Chipset 110 comprises platform controller hub (PCH) 199. Processor 102 is connected to chipset 110 via processor interface 106, and processor 104 is connected to chipset 110 via processor interface 108. Memory 120 is connected to chipset 110 via a memory bus 122. Graphics adapter 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a Serial Peripheral Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channel 182 that can provide an interface to devices that are internal or external to information handling system 100. In a particular embodiment, network channel 182 of a different type than peripheral channel 172 and network interface 180 translates information from a format suitable to the peripheral channel to a format suitable to external devices. An example of network channel 182 includes InfiniBand channels, Fibre Channel channels, Gigabit Ethernet channels, proprietary channel architectures, or a combination thereof. Network channel 182 can be connected to external network resources (not illustrated), either directly or via component such as WLAN radio 195, WWAN radio 196, or both. The network resource can include another information handling system, a data storage system, another network, a grid management system, another suitable resource, or a combination thereof.

BMC 190 is connected by a management interface 192 to a plurality of system components, such as processor 102, processor 104, memory 120, chipset 110, graphics adapter 130, I/O interface 170, disk controller 150, NVRAM module 140, TPM 176, network interface 180, and add-on resource 174. BMC 190 is connected to an external management interface 194 for platform management by an external IHS.

Network interface 180 is connected to WLAN radio 195 and WWAN radio 196 via network channel 182. WLAN radio 195 is connected to antenna controller (AC) 191 via interconnect 178. WWAN radio 196 is connected to AC 191 via interconnect 179. AC 191 is connected to proximity sensor (P-sensor) 193 via interconnect 171. AC 191 is connected to integrated system hub (ISH) 197 via interconnect 175. ISH 197 is connected to system embedded controller (EC) 198 via interconnect 176. AC 191 is connected to system EC 198 via interconnect 177. System EC 198 is connected to NVRAM 140 comprising BIOS/EFI 142 via interconnect 145. NVRAM 140 is connected to WLAN radio 195 via interconnect 143. NVRAM 140 is connected to WWAN radio 195 via interconnect 144. AC 191 is connected to platform controller hub (PCH) 199 via interconnect 173. PCH 199 can be connected to a development tool 147 via interconnect 146. Elements within IHS 100 can be implemented as described using similar names with respect to elements shown on other drawings described below.

Figure 2:
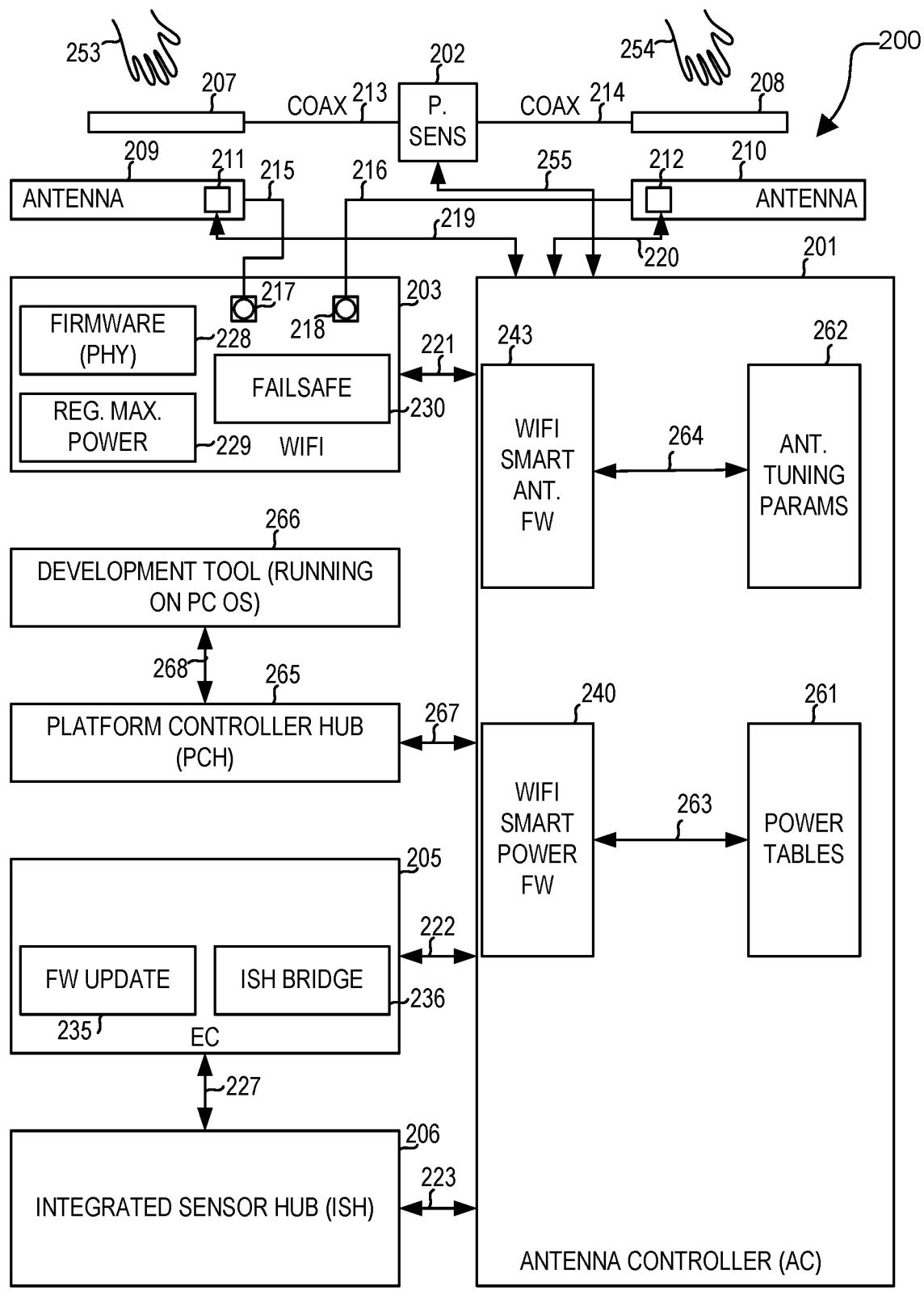
FIG. 2 is a block diagram illustrating a system for adjusting a radio transmit power level based on usage of an IHS using a serial interface protocol to a radio according to an embodiment of the present disclosure.

FIG. 2 shows a system for adjusting a radio transmit power level based on usage of an IHS using a serial interface protocol to a radio according to an embodiment of the present disclosure. System 200 includes AC 201, proximity sensor (P-sensor) 202, WLAN radio (for example WiFi radio, where WiFi refers to the Institute of Electrical and Electronics Engineers 802.11 wireless local area network standard) 203, system EC 205, integrated sensor hub (ISH)

206, platform controller hub (PCH) 265, development tool 266, proximity sensing conductor 207, proximity sensing conductor 208, antenna 209, and antenna 210.

In the case of active antennas, antenna 209 can include antenna tuning circuit 211, and antenna 210 can include antenna tuning circuit 212. AC 201 includes WLAN radio smart power firmware block 240, WLAN radio smart antenna firmware block 243, power tables block 261, and antenna tuning parameters block 262. WLAN radio 203 includes firmware block 228 for the radio physical interface (PHY), regulatory maximum power value storage block 229, failsafe block 230, antenna connector 217, and antenna connector 218. System EC 205 includes firmware update block 235 and ISH bridge block 236. Development block 266 may, for example, be executed on a host processor by an operating system of the IHS. Optionally, system 200 may include a basic input/output system (BIOS). The BIOS may include a BIOS power tables block.

AC 201 is connected to P-sensor 202 via interconnect 255. P-sensor 202 is connected to proximity sensing conductor 207 via interconnect 213, which may, for example, be a coaxial cable or a stripline, such as a microstrip, transmission line. P-sensor 202 is connected to proximity sensing conductor 208 via interconnect 214, which may, for example, be a coaxial cable or a stripline, such as a microstrip, transmission line. AC 201 is connected to antenna tuning circuit 211 via interconnect 219. AC 201 is connected to antenna tuning circuit 212 via interconnect 220. Antenna connector 217 is connected to antenna 209 via interconnect 215, which may, for example, be a coaxial cable or a stripline, such as a microstrip, transmission line.

Antenna connector 218 is connected to antenna 210 via interconnect 216, which may, for example, be a coaxial cable or a stripline, such as a microstrip, transmission line. Proximity sensing conductor 207 is located proximate to antenna 209 and is sensitive to the presence of a user (for example, a portion of a body of the user), such as hand 253, proximate to proximity sensing conductor 207, and thus proximate to antenna 209. Proximity sensing conductor 208 is located proximate to antenna 210 and is sensitive to the presence of a user (for example, a portion of a body of the user), such as hand 254, proximate to proximity sensing conductor 208, and thus proximate to antenna 210.

System EC 205 is connected to ISH 206 via interconnect 227. AC 201 is connected to WLAN radio 203 via interconnect 221. AC 201 is connected to system EC 205 via interconnect 222. AC 201 is connected to ISH 206 via interconnect 223. AC 201 is connected to PCH 265 via interconnect 267. PCH 265 is connected to development tool 266 via interconnect 268. AC 201 and WLAN radio 203 can communicate a unidirectional or bidirectional heartbeat message between each other, for example, via interconnect 221. The heartbeat message can be sent periodically. A timer can be reset when a heartbeat message is received. If the timer exceeds a specified value, indicating the cessation of reception of the heartbeat messages, a selection of a failsafe radio transmit power level can be triggered. The triggering of the failsafe radio transmit power level can assure the wireless subsystem maintains regulatory compliance of its transmissions even in absence of control information, such as proximity sensing information from P-sensor 202 and sensor information from ISH 223.

WLAN smart power firmware block 240 (for example, as executed on a processor of a microcontroller unit (MCU) of AC 201) is connected to power table block 261 (for example, as stored in a memory of the MCU) via interconnect 263. WLAN radio smart antenna firmware block 243 (for example, as executed on a processor of the MCU) is connected to antenna tuning parameter block 262 (for example, as stored in a memory of the MCU) via interconnect 264.

Figure 3:
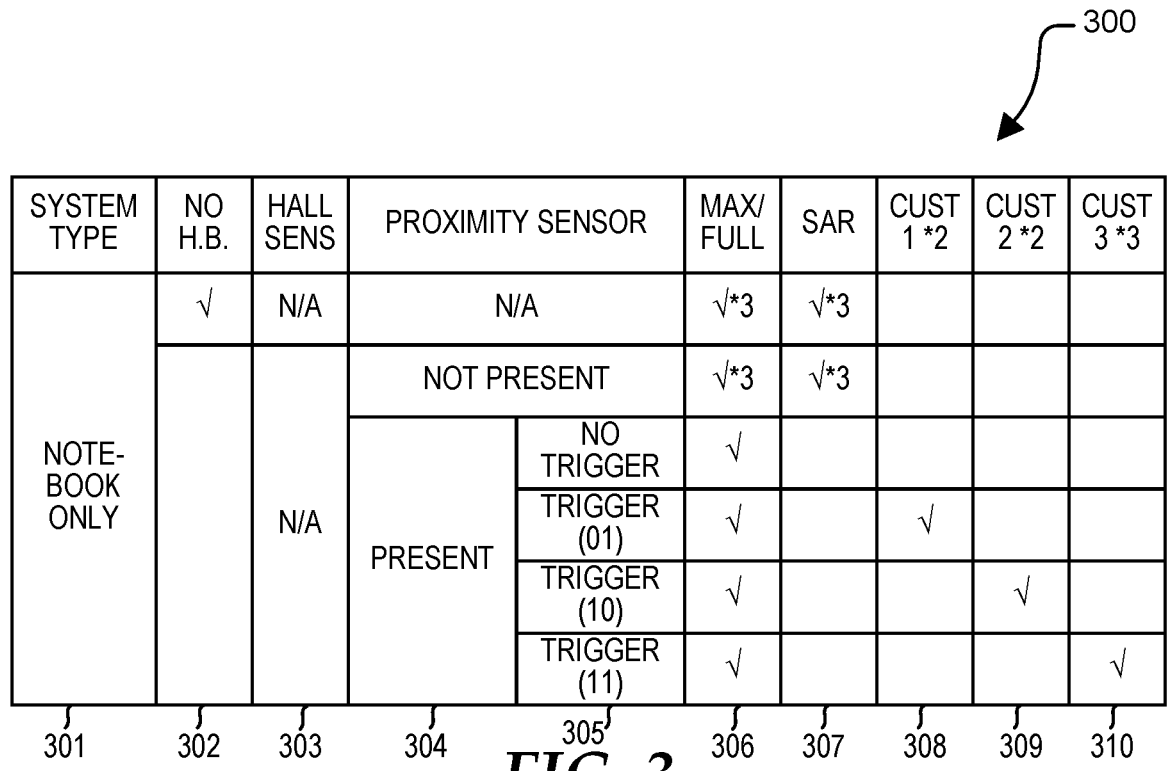
FIG. 3 is a tabular diagram illustrating a table for selection of a power table in response to occurrence of a usage condition according to an embodiment of the present disclosure.

FIG. 3 shows a table for selection of a power table in response to occurrence of a usage condition according to an embodiment of the present disclosure. Table 300 includes a plurality of columns 301 to 310 and a plurality of rows. Column 301 corresponds to system type, as shown by the example of a notebook only, meaning, for such example, the system is of a type that can be used in a notebook mode but not a tablet mode. Other system types for other combinations of modes are possible. Column 302 corresponds to a non-existence of an expected heartbeat message or the absence (for example, through failure or physical absence) of an antenna controller from the wireless subsystem. The check mark indicates appropriateness of selection of a power table having radio transmit power levels that can remain regulatorily compliant in absence of the heartbeat message or in absence of the antenna controller.

Column 303 corresponds to a value from a Hall-effect sensor, as may detect magnetic fields, but is shown as not applicable (N/A) for all cases in the illustrated example. Column 304 corresponds to a value from a proximity sensor, such as proximity sensor 202 of FIG. 2. The first row under column 304 is shown as not applicable, as proximity sensor information can be disregarded as potentially erroneous in the absence of a heartbeat message or in the absence of an antenna controller, which are the cases to which the first row pertains. The second row under column 304 is shown as not present, meaning that a proximity sensor is not present in the wireless subsystem (for example, through failure or physical absence).

The check marks in columns 306 and 307 with *3 following them refer to a note that the minimum power value shall be selected from whichever of the corresponding entry in a maximum/full-power table to which column 306 corresponds and the corresponding entry in a specific-absorption-rate (SAR) table to which column 307 corresponds is lower in value, and that selection of the minimum power value from among those two tables applies to both the first row, when the heartbeat message or antenna controller is absent, and the second row, when the proximity sensor is absent.

The third entry under column 304, which spans the third, fourth, fifth, and sixth rows of table 300, pertains to a situation where a proximity sensor, such as proximity sensor 202 of FIG. 2, is present in the wireless subsystem. Column 305 sets forth specific triggering cases of the proximity sensor, where the third row corresponds to no triggering, the fourth row corresponds to triggering represented by a binary pattern 01, the fifth row corresponds to triggering represented by a binary pattern 10, and the sixth row corresponds to triggering represented by a binary pattern 11. Column 306 pertains to applicability of a maximum/full-power table. The check marks in the third, fourth, fifth, and sixth rows of column 306 indicate applicability of the maximum/full-power table for the cases where a proximity sensor is present. Column 307 pertains to applicability of a SAR table having radio transmit power levels to comply with SAR requirements.

Columns 308, 309, and 310 correspond to custom power tables corresponding to particular cases of triggering, as represented by respective binary patterns discussed above. The first custom power table pertains to the triggering case denoted by binary pattern 01, as shown by the check mark in column 308. The second custom power table pertains to the triggering case denoted by binary pattern 10, as shown by the check mark in column 309. The third custom power table pertains to the triggering case denoted by binary pattern 11, as shown by the check mark in column 310. The *2 notations with respect to columns 308 and 309 pertain to a note that the power cut back for proximity sensor triggering can be selected to depend on whether, for example, one or both of proximity sensing conductor 207 and 208 are triggered.

A WLAN radio can use a maximum transmit power based on a regulatory maximum power table and an engineering maximum power table, which may, for example, be referred to as a transmit target power table or an Institute of Electrical and Electronics Engineers (IEEE) maximum power table. Such a power table can provide the default maximum power settings for the radio. The WLAN radio can also use a SAR power table, which may be platform specific and which may be read from BIOS. The SAR power table can be common for all regions and aggressive in cutbacks, to lower the maximum allowed transmit power for specific platforms. These tables can be used by the radio as failsafe maximum power limitation settings in case communication between the AC and the radio fails.

In accordance with at least one embodiment, an AC can provide updated radio transmit power level values in an updated power table, such as a power cutback table, and such updated power tables can be region specific, platform specific, can include non-dual-band-simultaneous (non-DBS) and dual-band-simultaneous (DBS) cutbacks, and can include cutbacks based on a particular proximity sensing conductor triggered a proximity event. DBS operation refers to simultaneous operation on two different radio frequency (RF) bands. DBS operation can also be called concurrent-dual-band (CBD) operation, and a wireless subsystem can operate in a DBS/CDB mode to provide DBS operation/CDB operation. While a radio keeps receiving heartbeat messages from an AC, it can use a radio-card-specific maximum power limitation. The maximum power can be based on a regulatory maximum power table and an engineering maximum power table and can ignore any maximum power limitation or SAR table that may be present in BIOS. A radio can use a different power limitation, such as a reduced power limitation, when an indication is received from the AC. The reduced power limitation can be a reduction of power as compared with a maximum power limitation. The AC can send an indication to the radio to switch to an updated power limitation table, such as a reduced power limitation table, or can reset the radio card back to a specific maximum power limitation based on external events or conditions, such a P-sensor or Hall-effect sensor trigger or a discontinuation thereof. An updated power limitation table can be a table that the AC has updated in accordance with events or conditions or can be a pre-existing table that the AC has retrieved for use in accordance with events or conditions. The rate at which the power limitations are adjusted can be nearly real-time, such as on the order of seconds.

In accordance with at least one embodiment, when a trigger is detected, an AC can pass on a power table, such as a 36-byte power table, to the radio. The radio can then use either the normal mode or DBS/CDB mode values based on whether a DBS/CDB mode is currently active or not. The AC can maintain tables for each supported region and select an appropriate table or tables depending on the region in which the IHS is being used.

Figure 4:
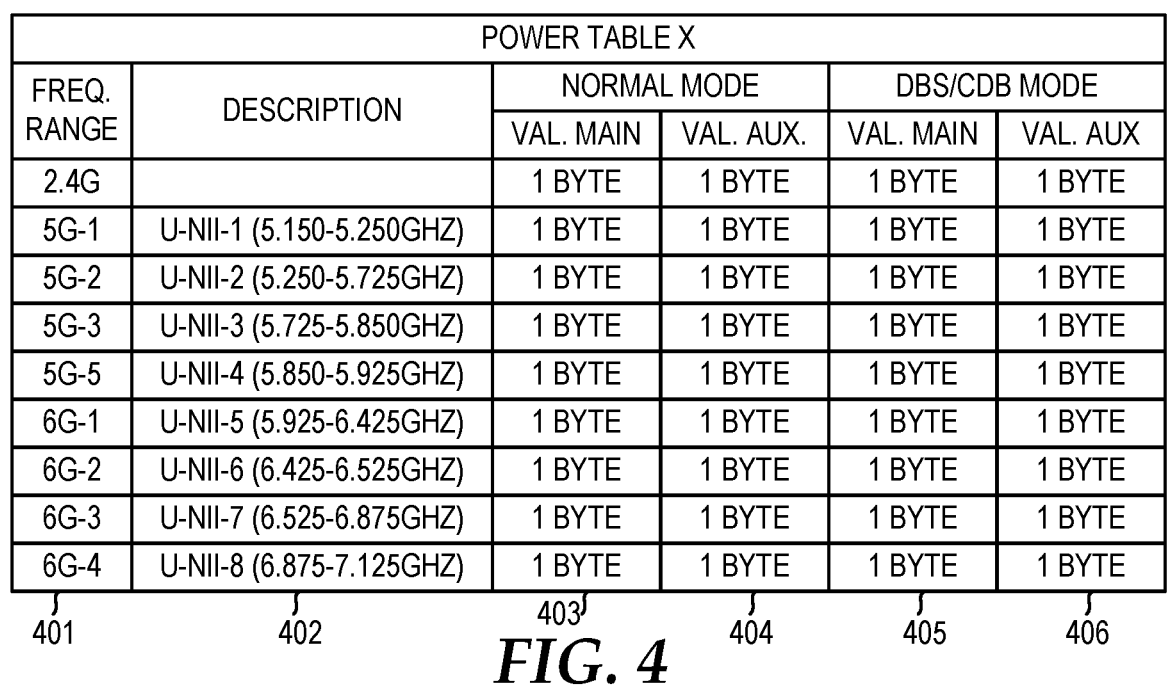
FIG. 4 is a tabular diagram illustrating a power table setting forth radio transmit power level values for different modes according to an embodiment of the present disclosure.

FIG. 4 shows a power table setting forth radio transmit power level values for different modes according to an embodiment of the present disclosure. Table 400 includes columns 401 to 406. Column 401 denotes a frequency range of the radio, with exemplary values for 2.4 GHz, several bands of 5 GHz, and several bands of 6 GHz. Column 402 denotes a description of the entries for the bands set forth in column 401. Columns 403 and 404 both pertain to a normal mode, with column 403 setting forth a main antenna value for a main antenna and column 404 setting forth an auxiliary antenna value for an auxiliary antenna. Columns 405 and 406 both pertain to a dual-band simultaneous (DBS) or concurrent dual-band (CDB) mode, both of which refer to an operation mode where both 2.4 GHz and 5 GHz radios are concurrently transmitting, so the mode will be referred to as a DBS/CDB mode.

Column 405 sets forth a main antenna value for a main antenna for the DBS/CDB mode, and column 406 sets forth an auxiliary antenna value for an auxiliary antenna for the DBS/CDB mode. As shown in table 400, each of the nine rows of each of the four columns 403 through 406 are shown as one byte, meaning each value for each of the normal-mode main antenna value, the normal-mode auxiliary antenna value, the DBS/CDB mode main antenna value, and the DBS/CDB mode auxiliary antenna value for each frequency range of column 401 are stored as a one-byte value. Thus, the nine rows of four columns of one-byte values total 36 bytes, meaning a complete power table can be stored in 36 bytes, and those 36 bytes can be rapidly communicated from AC 201 to radio 203 via interconnect 221, which is a direct communication interface between AC 201 and radio 203. Interconnect 221 may, for example, be a serial data connection, such as provided by a universal asynchronous receiver/transmitter (UART), using a serial interface protocol to communicate, or another type of direct communication interface directly connected to AC 201 and radio 203.

Figure 5:
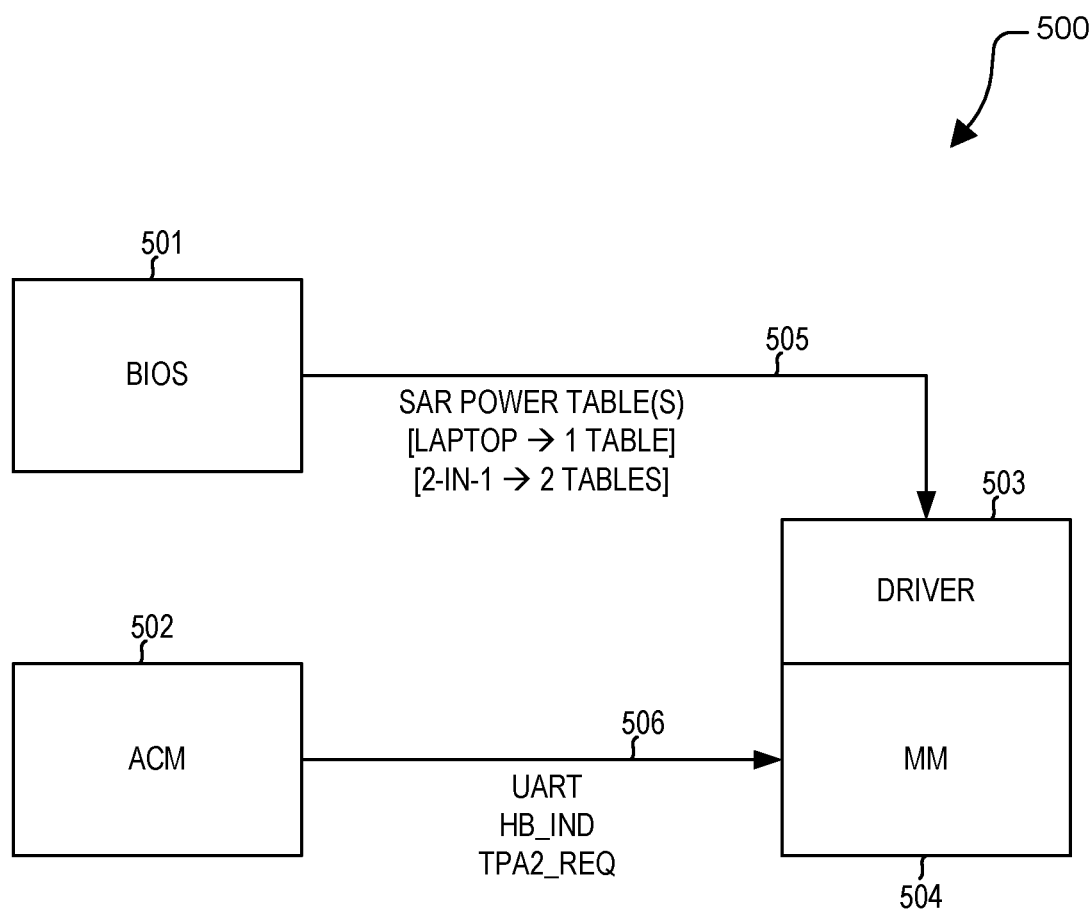
FIG. 5 is a block diagram illustrating interaction of elements of a system according to an embodiment of the present disclosure.

FIG. 5 shows interaction of elements of a system according to an embodiment of the present disclosure. Such interaction can be implemented to provide dynamic control of a radio transmit power level, for example, to support dynamic transmit power level cutback. System 500 includes BIOS 501, antenna controller module (ACM) 502 (for example, AC 201 of FIG. 2), modem module (MM) 504 (for example, radio 203 of FIG. 2), and MM driver 503. BIOS 501 can pass power tables stored in BIOS 501 via interconnect 505 to MM driver 503, which can provide the power tables to MM 504. As an example, a power table can be a SAR power table. As an example, BIOS 501 can provide one power table for a laptop computer to be operated in a single mode (for example, a notebook mode) and two power tables for a 2-in-1 computer, which can be operated in either of two modes (for example, a notebook mode and a tablet mode).

Alternatively, ACM 502 can provide power tables via interconnect 506 to MM 504, for example, via a direct communication interface, for example, a serial data connection, such as one provided via a UART. ACM 502 can pass heartbeat messages to and from MM 504 to assure connectivity of the respective operational system elements. ACM 502 can send request to MM 504, such as a request for MM 504 to use a power table or a radio transmit power level specified in a power table. Such a power table can be obtained, as one example, from BIOS 501, or, as another example, from ACM 502.

Figure 6:
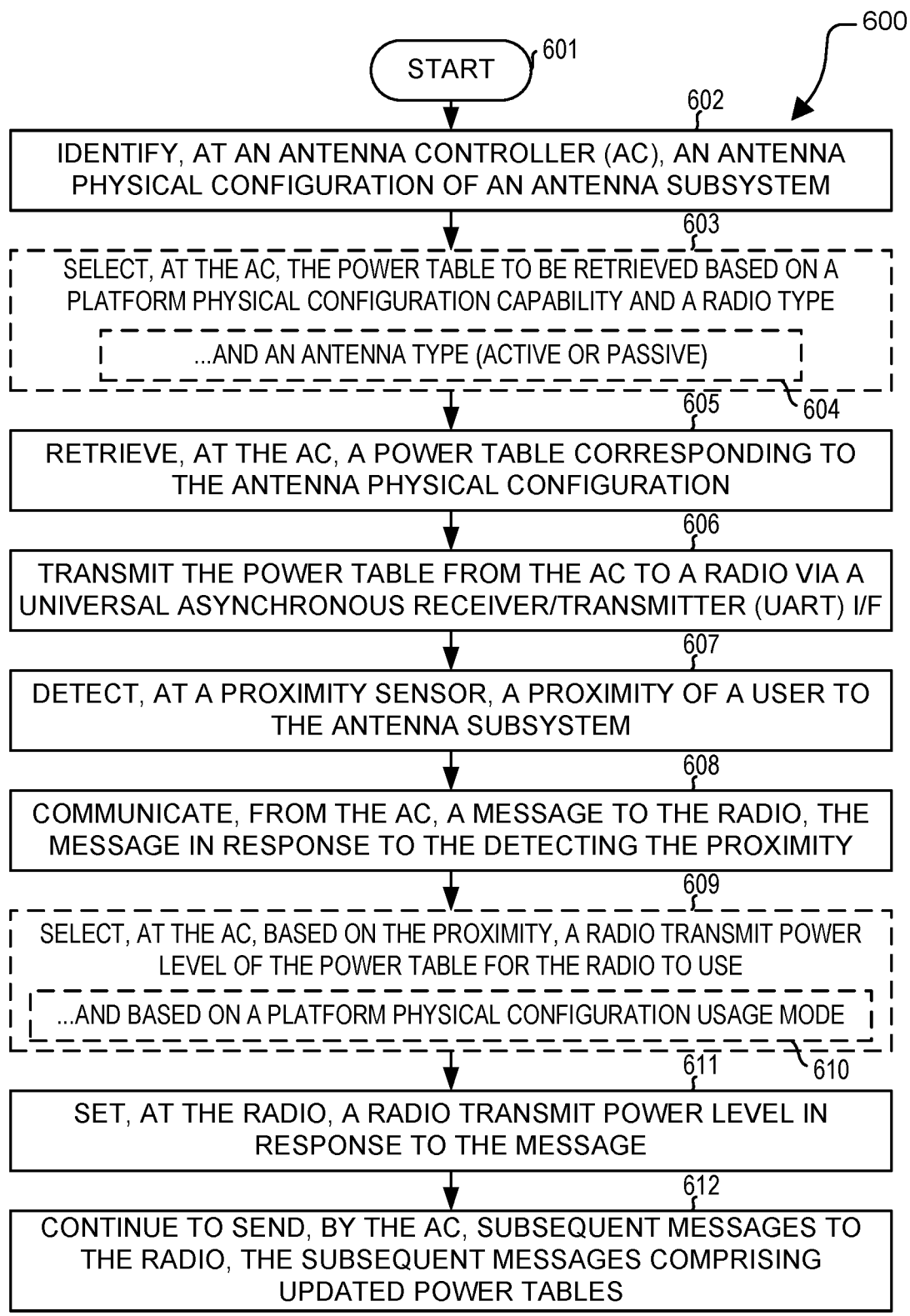
FIG. 6 is a flow diagram illustrating a method for adjusting a radio transmit power level based on usage of an IHS using a serial interface protocol to a radio according to an embodiment of the present disclosure.

FIG. 6 illustrates a method for adjusting a radio transmit power level based on usage of an IHS using a serial interface protocol to a radio according to an embodiment of the present disclosure. Method 600 begins at block 601 and continues to block 602. At block 602, an AC identifies an antenna physical configuration of an antenna subsystem.

From block 602, method 600 continues to block 603. At block 603, the AC selects the power table to be retrieved based on a platform physical configuration capability and a radio type. As shown by block 604, optionally the selection of block 603 can be based on an antenna type selected from an active antenna type and a passive antenna type. From block 603, method 600 continues to block 605. At block 605, the AC retrieves a power table corresponding to the antenna physical configuration. From block 605, method 600 continues to block 606.

At block 606, the AC transmits the power table from the AC to a radio, for example, via a UART. From block 606, method 600 continues to block 607. At block 607, a proximity sensor detects a proximity of a user to an antenna subsystem. From block 607, method 600 continues to block 608. At block 608, the AC communicates a message to the radio. The message is communicated in response to the detecting the proximity of the user to the antenna subsystem. From block 608, method 600 continues to block 609. At block 609, the AC selects, based on the proximity, a radio transmit power level of the power table for the radio to use. As shown by block 610, the selecting may also be based on a platform physical configuration usage mode. From block 609, method 600 continues to block 611. At block 611, the radio sets a radio transmit power level in response receiving the message. From block 612, the AC continues to send subsequent message to the radio, wherein the subsequent message includes updated power tables.

In accordance with at least one embodiment, a system and method is provided to adjust a radio transmit power level based on usage using a serial interface protocol to a WLAN radio. While static SAR power tables can be implemented in a BIOS, which may be implemented as a system management BIOS (SMBIOS) and WLAN radio (for example, WiFi) drivers for alternative platforms. However, the difficulties of providing or updating a custom BIOS or a driver to implement changes to existing tables for adding frequency bands or adding new tables for new usage modes can be cumbersome. A static mapping of tables to usage modes and antennas can limit the ability to dynamically switch antennas and tables based on a usage mode. Also, switching antennas would result in the addition of power tables and a logical mapping of the tables to attached antennas, which, if implemented using only BIOS, would involve implementation of logic at low latency to communicate antenna advanced configuration and power interface (ACPI) events to BIOS. A solely BIOS-based approach would involve adding new power tables to the BIOS as well as an updated WLAN driver to support the new power tables. A division between radio vendors and BIOS vendors could complicate efforts to implement a purely BIOS-based approach. Such an approach could be further complicated when antennas are switched or shared with other radios. Accordingly, providing an AC with the ability to provide updated power tables to a radio, such as a WLAN radio, can avoid much complication and provide technological improvement. By providing dynamic power table delivery from a more readily updatable component, such as an AC, which can be accomplished, for example, using serial messaging over a serial communication line from the AC to radio, changes to the power tables used by the radio are more easily made. As an example, the radio may be a wireless-local-area-network (WLAN) data radio.

In accordance with at least one embodiment, power tables can be communicated from a MCU of an AC through a UART to a WLAN radio. In accordance with at least one embodiment, dynamic power table selection can be based on a stock keeping unit (SKU), a mode pin, and P-sensor inputs, where, for example, one SKU may represent a WLAN antenna configuration for basic operation and another SKU may represent a WLAN antenna configuration with more advanced features), and several of such WLAN antenna configurations can be supported under a single BIOS. As an example, each SKU can represent a specific model of a part or a plurality of parts that may be installed to provide a respective particular hardware configuration of an IHS or a subsystem of an IHS. The mode pin can provide a binary value representative of a usage mode of an IHS. The P-sensor inputs can provide detection of proximity of a user to antennas of an antenna subsystem.

WLAN (for example, WiFi) SAR transmit power level cutback can be used to comply with regulatory obligations. Such cutback is performed when a human is in close proximity to the system, especially the antenna subsystem. In some cases, the transmit power cutback may be different for different SKUs or different usage modes (for example, tablet mode vs. notebook mode) of the system. Adaptive cutback based on proximity sensing and usage mode can avoid reduction in WLAN transmission and reception throughput that could occur if power were cut back to a constant low power at all times even if there is no human proximity and regardless of whether the system is in notebook or tablet mode.

In accordance with at least one embodiment, a communication path and protocol are provided between an AC and a radio, such as a WLAN radio, as may be implemented using a UART. The AC shall send specific updated transmit power cutback values to the WLAN radio at run time, dynamically at lower latency, for example, on the order of milliseconds, based on system parameters such as a SKU, a platform usage mode (for example, a notebook mode vs. a tablet mode), a lid state (for example, open vs. closed) or human proximity, as may be sensed using a proximity sensor. Accordingly, WLAN module performance at peak power can be provided at all times. The ability of the AC to provide updated power tables and updated power level selections to the radio dynamically during operation provides the flexibility to add and store any number of SAR power tables inside the MCU of the AC, mapping the values based on type of platform (for example, 2-in-1, detachable, notebook, tablet, phone, etc.), usage mode (for example, notebook mode vs. tablet mode), antenna configuration (for example, active or passive), and number of antennas (for example, 1, 2, 3, 4, . . . ) and to pass the relevant table as a payload to WLAN radio to update radio transmit power level values, resulting in a much more granular level of power management, resulting in optimized performance.

A 36-byte payload structure is defined to relay the tables to the WLAN radio via a serial messaging protocol. Proposed solution hosts a smart power algorithm mapping transmit power values to associated antennas, antenna type, and device modes and relays the most appropriate table to the radio during run time based on the antenna operation environment. Embodiments can be implemented with different types of radios. Embodiments can be implemented with different types of system-on-chip (SOC) and different types of BIOS and can be enabled via a serial messaging protocol. A capability is provided to switch, share, and manage a plurality of antennas in run time with other radios and still able to deliver enhanced overall system performance by the MCU actively managing antennas and their associated power tables and communicating to radios. In accordance with at least one embodiment, an AC can offload an antenna SAR table as a payload to a WLAN radio via a serial interface, for example, when a proximity sensing event is triggered.

In accordance with at least one embodiment, a method comprises identifying, at an antenna controller (AC), an antenna physical configuration of an antenna subsystem; retrieving, at the AC, a power table corresponding to the antenna physical configuration; transmitting the power table from the AC to a radio via a direct communication interface between the AC and the radio, such as a universal asynchronous receiver/transmitter (UART) interface; transmitting a heartbeat message between the AC and the radio, wherein, when cessation of reception of the heartbeat message is detected, the radio is set to a failsafe radio transmit power level; detecting, at a proximity sensor, a proximity of a user to the antenna subsystem; communicating, from the AC, a message to the radio, the message in response to the detecting, at the proximity sensor, the proximity of the user; and setting, at the radio, a radio transmit power level in response to the message. As an example, the setting may involve reducing the radio transmit power level in response to a proximity sensor triggering. In accordance with at least one embodiment, the method further comprises selecting, at the AC, the power table to be retrieved based on a platform physical configuration capability and a radio type.

In accordance with at least one embodiment, the selecting, at the AC, the power table further comprises selecting, at the AC, the power table based on an antenna type selected from a group consisting of an active antenna type and a passive antenna type. In accordance with at least one embodiment, the communicating, from the AC, the message to the radio comprises receiving, at the radio, an updated power table in the message. In accordance with at least one embodiment, the method further comprises selecting, at the AC, based on the proximity, a radio transmit power level of the power table for the radio to use. In accordance with at least one embodiment, the selecting, at the AC, based on the proximity, a radio transmit power level of the power table for the radio to use comprises selecting, at the AC, based on the proximity and a platform physical configuration usage mode, the radio transmit power level of the power table for the radio to use. In accordance with at least one embodiment, the method further comprises continuing to send, by the AC, subsequent messages to the radio, the subsequent messages comprising updated power tables to specify radio transmit power levels for the radio to use.

In accordance with at least one embodiment, an information handling system (IHS) comprises an antenna subsystem; a radio connected to the antenna subsystem; a proximity sensor configured to detect a proximity of a user to the antenna subsystem; and an antenna controller (AC) connected to the radio and to the proximity sensor, the AC configured to identify an antenna physical configuration of an antenna subsystem, to retrieve a power table corresponding to the antenna physical configuration, to transmit the power table to the radio via a universal asynchronous receiver/transmitter (UART) interface, and to communicate a message to the radio, the message in response to the proximity of the user to the antenna subsystem, the radio configured to set a radio transmit power level in response to the message. As an example, the setting may involve reducing the radio transmit power level in response to a proximity sensor triggering. In accordance with at least one embodiment, the AC is further configured to select the power table to be retrieved based on a platform physical configuration capability and a radio type. In accordance with at least one embodiment, the AC is further configured to select the power table based on an antenna type selected from a group consisting of an active antenna type and a passive antenna type. In accordance with at least one embodiment, the radio is further configured to receive an updated power table in the message. In accordance with at least one embodiment, the AC is further configured to select, based on the proximity, a radio transmit power level of the power table for the radio to use. In accordance with at least one embodiment, the AC is further configured, in selecting, based on the proximity, the radio transmit power level, to select, based on the proximity and a platform physical configuration usage mode, the radio transmit power level. In accordance with at least one embodiment, the AC is further configured to continue to send subsequent messages to the radio, the subsequent messages comprising updated power tables to specify radio transmit power levels for the radio to use.

In accordance with at least one embodiment, a method comprises identifying, at an antenna controller (AC), an antenna physical configuration of an antenna subsystem; retrieving, at the AC, a power table corresponding to the antenna physical configuration; transmitting the power table from the AC to a radio; detecting, at a proximity sensor, a proximity of a user to the antenna subsystem; communicating, from the AC, a message to the radio, the message in response to the detecting, at the proximity sensor, the proximity of the user; and setting, at the radio, a radio transmit power level in response to the message. As an example, the setting may involve reducing the radio transmit power level in response to a proximity sensor triggering. In accordance with at least one embodiment, the method further comprises selecting, at the AC, the power table to be retrieved based on a platform physical configuration capability and a radio type. In accordance with at least one embodiment, the selecting, at the AC, the power table further comprises selecting, at the AC, the power table based on an antenna type selected from a group consisting of an active antenna type and a passive antenna type. In accordance with at least one embodiment, the communicating, from the AC, the message to the radio comprises receiving, at the radio, an updated power table in the message. In accordance with at least one embodiment, the AC is further configured to select, based on the proximity, a radio transmit power level of the power table for the radio to use. In accordance with at least one embodiment, the selecting, at the AC, based on the proximity, a radio transmit power level of the power table for the radio to use comprises selecting, at the AC, based on the proximity and a platform physical configuration usage mode, the radio transmit power level of the power table for the radio to use.

For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, the information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, the information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. Information handling systems can also include one or more buses operable to transmit information between the various hardware components.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a standalone device).

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
   identifying, at an antenna controller (AC), an antenna physical configuration of an antenna subsystem;
   retrieving, at the AC, a power table corresponding to the antenna physical configuration;
   transmitting the power table to a radio via a direct communication interface between the AC and the radio;
   transmitting a heartbeat message between the AC and the radio, wherein, when cessation of reception of the heartbeat message is detected, the radio is set to a failsafe radio transmit power level;
   detecting, at a proximity sensor, a proximity of a user to the antenna subsystem;
   communicating, from the AC, a message to the radio, the message in response to the detecting, at the proximity sensor, the proximity of the user; and
   setting, at the radio, a radio transmit power level in response to the message.

2. The method of claim 1 further comprising selecting, at the AC, the power table to be retrieved based on a platform physical configuration capability and a radio type.

3. The method of claim 2, wherein the selecting, at the AC, the power table further comprises selecting, at the AC, the power table based on an antenna type selected from a group consisting of an active antenna type and a passive antenna type.

4. The method of claim 1, wherein the communicating, from the AC, the message to the radio comprises receiving, at the radio, an updated power table in the message.

5. The method of claim 1 further comprising selecting, at the AC, based on the proximity, a radio transmit power level of the power table for the radio to use.

6. The method of claim 5, wherein the selecting, at the AC, based on the proximity, a radio transmit power level of the power table for the radio to use comprises selecting, at the AC, based on the proximity and a platform physical configuration usage mode, the radio transmit power level of the power table for the radio to use.

7. The method of claim 1 further comprising continuing to send, by the AC, subsequent messages to the radio, the subsequent messages comprising updated power tables to specify radio transmit power levels for the radio to use.

8. An information handling system (IHS) comprising:
   an antenna subsystem;
   a radio connected to the antenna subsystem;
   a proximity sensor configured to detect a proximity of a user to the antenna subsystem; and
   an antenna controller (AC) connected to the radio and to the proximity sensor, the AC configured to identify an antenna physical configuration of an antenna subsystem, to retrieve a power table corresponding to the antenna physical configuration, to transmit the power table to the radio via a universal asynchronous receiver/transmitter interface, and to communicate a message to the radio, the message in response to the proximity of the user to the antenna subsystem, the radio configured to set a radio transmit power level in response to the message.

9. The IHS of claim 8, wherein the AC is further configured to select the power table to be retrieved based on a platform physical configuration capability and a radio type.

10. The IHS of claim 9, wherein the AC is further configured to select the power table based on an antenna type selected from a group consisting of an active antenna type and a passive antenna type.

11. The IHS of claim 8, wherein the radio is further configured to receive an updated power table in the message.

12. The IHS of claim 8, wherein the AC is further configured to select, based on the proximity, a radio transmit power level of the power table for the radio to use.

13. The IHS of claim 12, wherein the AC is further configured, in selecting, based on the proximity, the radio transmit power level, to select, based on the proximity and a platform physical configuration usage mode, the radio transmit power level.

14. The IHS of claim 8, wherein the AC is further configured to continue to send subsequent messages to the radio, the subsequent messages comprising updated power tables to specify radio transmit power levels for the radio to use.

15. A method comprising:
    identifying, at an antenna controller (AC), an antenna physical configuration of an antenna subsystem;
    retrieving, at the AC, a power table corresponding to the antenna physical configuration;
    transmitting the power table to a radio;
    detecting, at a proximity sensor, a proximity of a user to the antenna subsystem;
    communicating, from the AC, a message to the radio, the message in response to detecting a proximity of the user to the antenna subsystem; and
    setting a radio transmit power level in response to the message.

16. The method of claim 15 further comprising selecting, at the AC, the power table to be retrieved based on a platform physical configuration capability and a radio type.

17. The method of claim 15, wherein the selecting the power table further comprises selecting the power table based on an antenna type selected from a group consisting of an active antenna type and a passive antenna type.

18. The method of claim 15, wherein the communicating the message to the radio comprises receiving, at the radio, an updated power table in the message.

19. The method of claim 15, wherein the AC is further configured to select, based on the proximity, a radio transmit power level of the power table for the radio to use.

20. The method of claim 15, wherein the selecting based on the proximity, a radio transmit power level of the power table for the radio to use comprises selecting based on the proximity and a platform physical configuration usage mode, the radio transmit power level of the power table for the radio to use.

* * * * *